(12) United States Patent
Vignali et al.

(10) Patent No.: US 9,033,297 B2
(45) Date of Patent: May 19, 2015

(54) CABIN AIR COMPRESSOR SUPPORT BRACKET

(71) Applicant: Hamilton Sundstrand Corporation, Windsor Locks, CT (US)

(72) Inventors: Mark Vignali, Northfield, CT (US); Luke J. Mayo, Coventry, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 171 days.

(21) Appl. No.: 13/909,338

(22) Filed: Jun. 4, 2013

(65) Prior Publication Data
US 2014/0353461 A1 Dec. 4, 2014

(51) Int. Cl.
*B60H 1/00* (2006.01)
*F16M 13/02* (2006.01)
*B64D 13/02* (2006.01)

(52) U.S. Cl.
CPC ........... *B60H 1/00535* (2013.01); *F16M 13/02* (2013.01); *B64D 13/02* (2013.01)

(58) Field of Classification Search
CPC ..... B60H 1/00535; B64D 13/02; F16M 13/02
USPC .............. 248/674, 675, 309.1, 200, 300, 639; 29/48; 244/54
See application file for complete search history.

(56) References Cited

U.S. PATENT DOCUMENTS

| | | | | |
|---|---|---|---|---|
| 2,883,135 | A * | 4/1959 | Smalley | 248/230.5 |
| 5,439,189 | A * | 8/1995 | Wiley et al. | 244/54 |
| 5,954,309 | A * | 9/1999 | Kato et al. | 248/636 |
| 6,270,051 | B1 * | 8/2001 | Power | 248/638 |
| 7,516,621 | B2 * | 4/2009 | Suttie et al. | 60/796 |
| 8,028,671 | B1 * | 10/2011 | Grozich | 123/195 A |
| 8,870,135 | B2 * | 10/2014 | Grubbs | 248/200 |
| 2014/0346301 | A1 * | 11/2014 | Mayo et al. | 248/309.1 |
| 2014/0346302 | A1 * | 11/2014 | Vignali et al. | 248/309.1 |
| 2014/0346315 | A1 * | 11/2014 | Mayo et al. | 248/674 |
| 2014/0353462 | A1 * | 12/2014 | Vignali et al. | 248/675 |
| 2014/0367543 | A1 * | 12/2014 | Mayo et al. | 248/309.1 |

* cited by examiner

*Primary Examiner* — Anita M King
(74) *Attorney, Agent, or Firm* — Cantor Colburn LLP (57) ABSTRACT

A support bracket for a cabin air compressor (CAC) assembly includes a CAC mounting portion with a plurality of CAC mounting holes distributed in an arc configuration along a CAC mounting hole circle radius. A support portion includes a ramped face that transitions to an upper lug portion and a substantially perpendicular face relative to the CAC mounting portion. An upper lug extends from the upper lug portion. The upper lug includes a coupling hole that is offset from a first CAC mounting hole of the CAC mounting holes at a length in a first direction and a length in a second direction. A ratio of the CAC mounting hole circle radius to the length in the first direction is between 2.14 and 2.20, and a ratio of the CAC mounting hole circle radius to the length in the second direction is between 1.16 and 1.19.

20 Claims, 6 Drawing Sheets

CABIN AIR COMPRESSOR SUPPORT BRACKET

BACKGROUND OF THE INVENTION

The subject matter disclosed herein relates to aircraft environmental control. More specifically, the subject disclosure relates to a support bracket of a cabin air compressor for an aircraft environmental control system.

Environmental control systems (ECSs) are utilized on various types of aircraft for several purposes, such as in cooling systems for the aircraft. For example, components of an ECS may be utilized to remove heat from various aircraft lubrication and electrical systems and/or used to condition aircraft cabin air. A cabin air conditioning and temperature control system (CACTCS) is an example of an aircraft ECS that includes air cycle packs supplied with pressurized outside (fresh) air from electric motor-driven cabin air compressors (CACs) which condition fresh air for cabin heating and cooling. The CACTCS provides flow control for modulation of cooling pack air flow, recirculation fans to circulate cabin air, and associated valves and sensors used for system control.

The CACTCS may also include a trim air system to provide individual cabin zone temperature control. This includes trim temperature control valves, trim duct heaters and associated sensors. As one example, a CACTCS may provide control of six baseline passenger zones and a flight deck zone. Additional zones, such as a forward cargo zone, a crew zone and/or an attendant zone may be controlled by other ECSs. Recirculation fans may also be provided for additional air flow to the passenger cabin and to ensure that flow at an air distribution nozzle remains constant.

Various elements of aircraft ECSs can experience harsh environments including a wide range of temperatures, pressures, and vibrations. Elements of aircraft ECSs must also fit within a compact space and minimize weight while providing adequate strength to handle typical and peak stresses over the anticipated life of the elements.

BRIEF DESCRIPTION OF THE INVENTION

According to one aspect, a support bracket for a cabin air compressor assembly is provided. The support bracket includes a cabin air compressor mounting portion with a plurality of cabin air compressor mounting holes distributed in an arc configuration along a cabin air compressor mounting hole circle radius. A support portion includes a ramped face that transitions to an upper lug portion and a substantially perpendicular face relative to the cabin air compressor mounting portion. An upper lug extends from the upper lug portion. The upper lug includes a coupling hole that is offset from a first cabin air compressor mounting hole of the cabin air compressor mounting holes at a length in a first direction and a length in a second direction. A ratio of the cabin air compressor mounting hole circle radius to the length in the first direction is between 2.14 and 2.20, and a ratio of the cabin air compressor mounting hole circle radius to the length in the second direction is between 1.16 and 1.19.

According to another aspect, a cabin air compressor support assembly includes a left-hand cabin air compressor support bracket coupled to a cabin air compressor assembly and an upper three-way mount. The cabin air compressor support assembly also includes a right-hand cabin air compressor support bracket coupled to the cabin air compressor assembly and a lower three-way mount. The right-hand cabin air compressor support bracket includes a cabin air compressor mounting portion with a plurality of cabin air compressor mounting holes distributed in an arc configuration along a cabin air compressor mounting hole circle radius. A support portion includes a ramped face that transitions to an upper lug portion and a substantially perpendicular face relative to the cabin air compressor mounting portion. An upper lug extends from the upper lug portion. The upper lug includes a coupling hole that is offset from a first cabin air compressor mounting hole of the cabin air compressor mounting holes at a length in a first direction and a length in a second direction. A ratio of the cabin air compressor mounting hole circle radius to the length in the first direction is between 2.14 and 2.20, and a ratio of the cabin air compressor mounting hole circle radius to the length in the second direction is between 1.16 and 1.19.

According to a further aspect, a method of installing a support bracket in a cabin air conditioning and temperature control system includes coupling an upper lug of the support bracket to a mount of the cabin air conditioning and temperature control system. A cabin air compressor mounting portion of the support bracket is coupled to a cabin air compressor assembly of the cabin air conditioning and temperature control system. The support bracket includes the cabin air compressor mounting portion with a plurality of cabin air compressor mounting holes distributed in an arc configuration along a cabin air compressor mounting hole circle radius. A support portion includes a ramped face that transitions to an upper lug portion and a substantially perpendicular face relative to the cabin air compressor mounting portion. The upper lug extends from the upper lug portion. The upper lug includes a coupling hole that is offset from a first cabin air compressor mounting hole of the cabin air compressor mounting holes at a length in a first direction and a length in a second direction. A ratio of the cabin air compressor mounting hole circle radius to the length in the first direction is between 2.14 and 2.20, and a ratio of the cabin air compressor mounting hole circle radius to the length in the second direction is between 1.16 and 1.19.

DETAILED DESCRIPTION OF THE INVENTION

Figure 1:
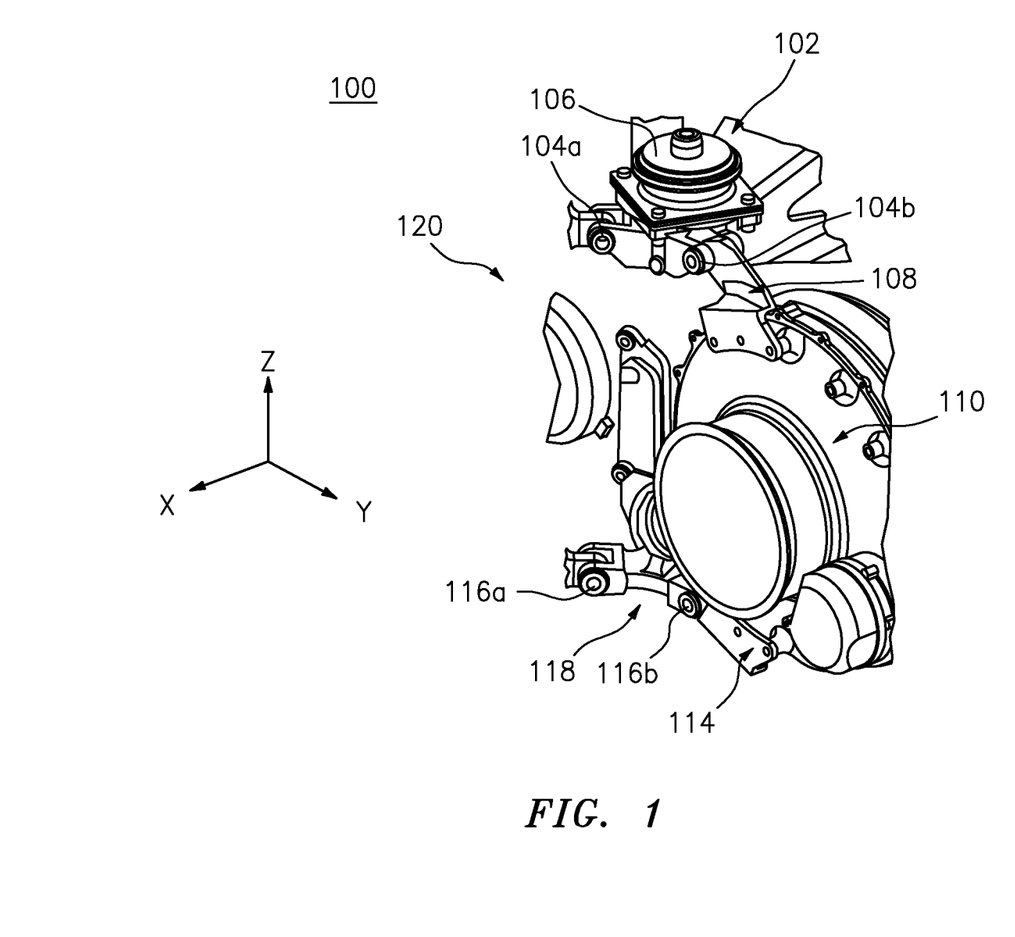
FIG. 1 is a partial perspective view of a cabin air conditioning and temperature control system.
Figure 2:
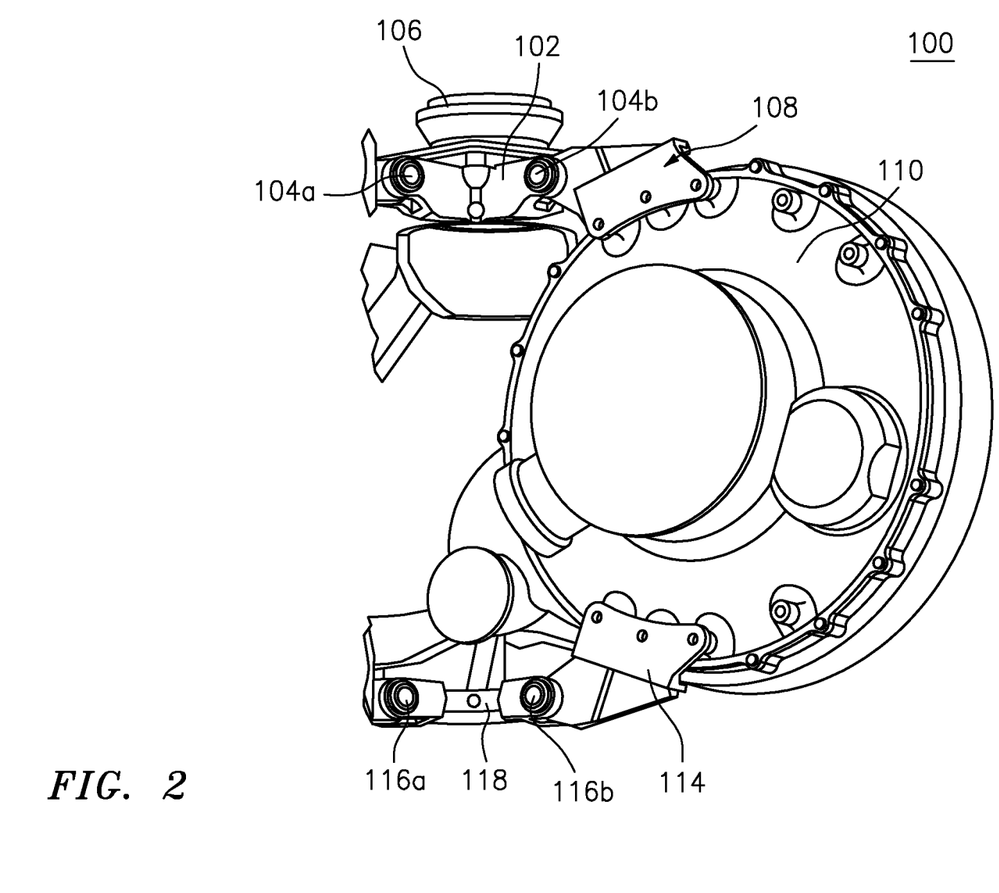
FIG. 2 is another partial perspective view of the cabin air conditioning and temperature control system of FIG. 1.

Shown in FIGS. 1 and 2 are partial perspective views of a cabin air conditioning and temperature control system (CACTCS) 100. The CACTCS 100 includes an upper three-way mount 102 with coupling points 104a and 104b. The upper three-way mount 102 may also be coupled to one or more vibration isolators 106. The coupling point 104b is coupled to a first cabin air compressor (CAC) support bracket 108 which is also coupled to a CAC 110. A second CAC support bracket 114 is coupled to the CAC 110 and a coupling point 116b of a lower three-way mount 118 as best viewed in FIG. 2. Similar to the upper three-way mount 102, the lower three-way mount 118 includes a pair of coupling points 116a and 116b. The first CAC support bracket 108 and the second CAC support bracket 114 collectively form a CAC support assembly 120. The first CAC support bracket 108 may also be referred to as a left-hand CAC support bracket, and the second CAC support bracket 114 may be referred to as a right-hand CAC support bracket. The coupling points 104a and 116a may be used to support a second CAC (not depicted), where the CAC 110 may be referred to as an inner CAC and the second CAC (not depicted) may be referred to as an outer CAC. The three-way mounts 102 and 118 limit CAC movement in three directions (X-Y-Z).

Figure 3:
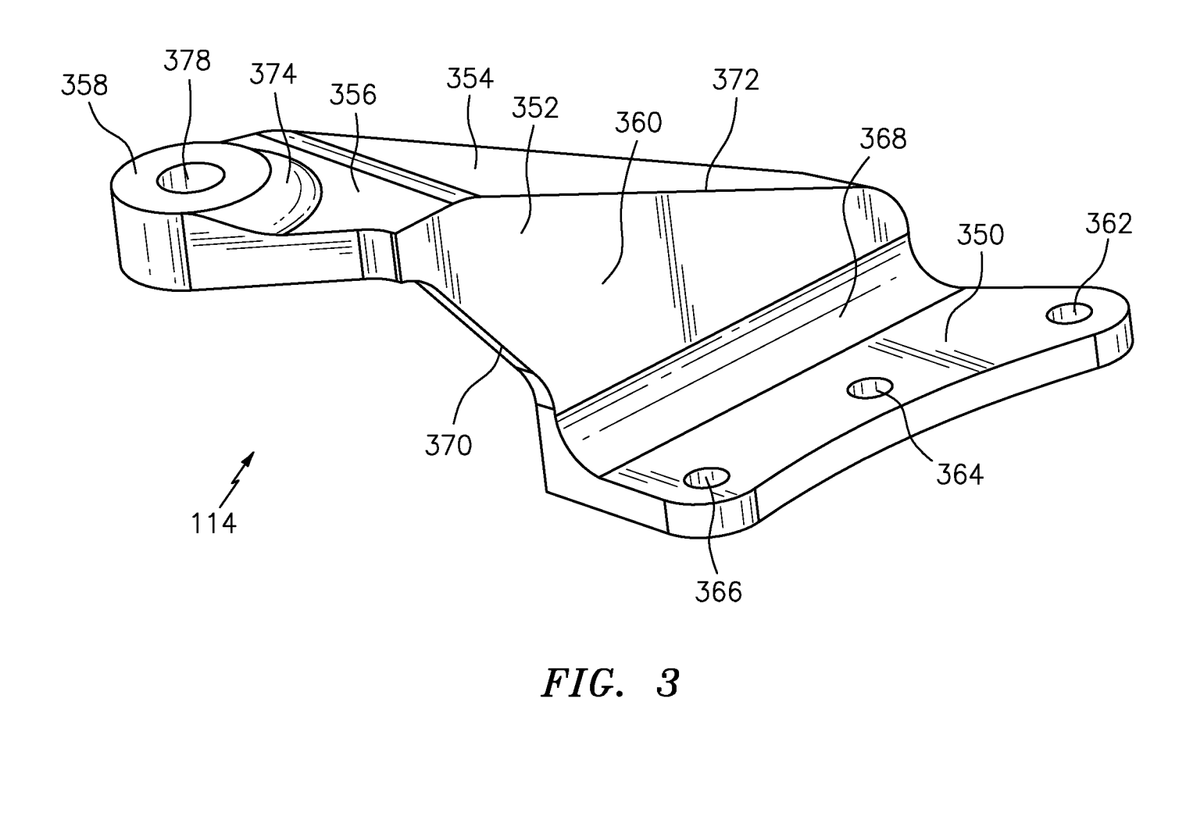
FIG. 3 is a perspective view of a cabin air compressor support bracket.

FIG. 3 is a perspective view of the second CAC support bracket 114 of FIGS. 1 and 2. The second CAC support bracket 114 includes a CAC mounting portion 350, a support portion 352, an upper lug portion 356, and an upper lug 358. The support portion 352 includes a ramped face 354 that transitions to the upper lug portion 356. The support portion 352 also includes a substantially perpendicular face 360 relative to the CAC mounting portion 350. The CAC mounting portion 350 includes a first CAC mounting hole 362, a second CAC mounting hole 364, and a third CAC mounting hole 366 distributed in an arc configuration. The CAC mounting holes 362 and 366 are also referred to as the outermost CAC mounting holes 362 and 366 relative to the CAC mounting hole 364. A curved transition region 368 is formed between the substantially perpendicular face 360 and the CAC mounting portion 350. An inner angled edge 370 and an outer angled edge 372 are defined along the substantially perpendicular face 360 between the CAC mounting portion 350 and the upper lug portion 356, where the outer angled edge 372 is an edge of the ramped face 354. A curved transition region 374 is formed between the upper lug portion 356 and the upper lug 358. The upper lug 358 extends from the upper lug portion 356 and includes a coupling hole 378.

The CAC mounting holes 362-366 are configured to mate the second CAC support bracket 114 to the CAC 110 of FIG. 1. The coupling hole 378 is configured to mate the second CAC support bracket 114 with the coupling point 116b of FIG. 1.

Figure 4:
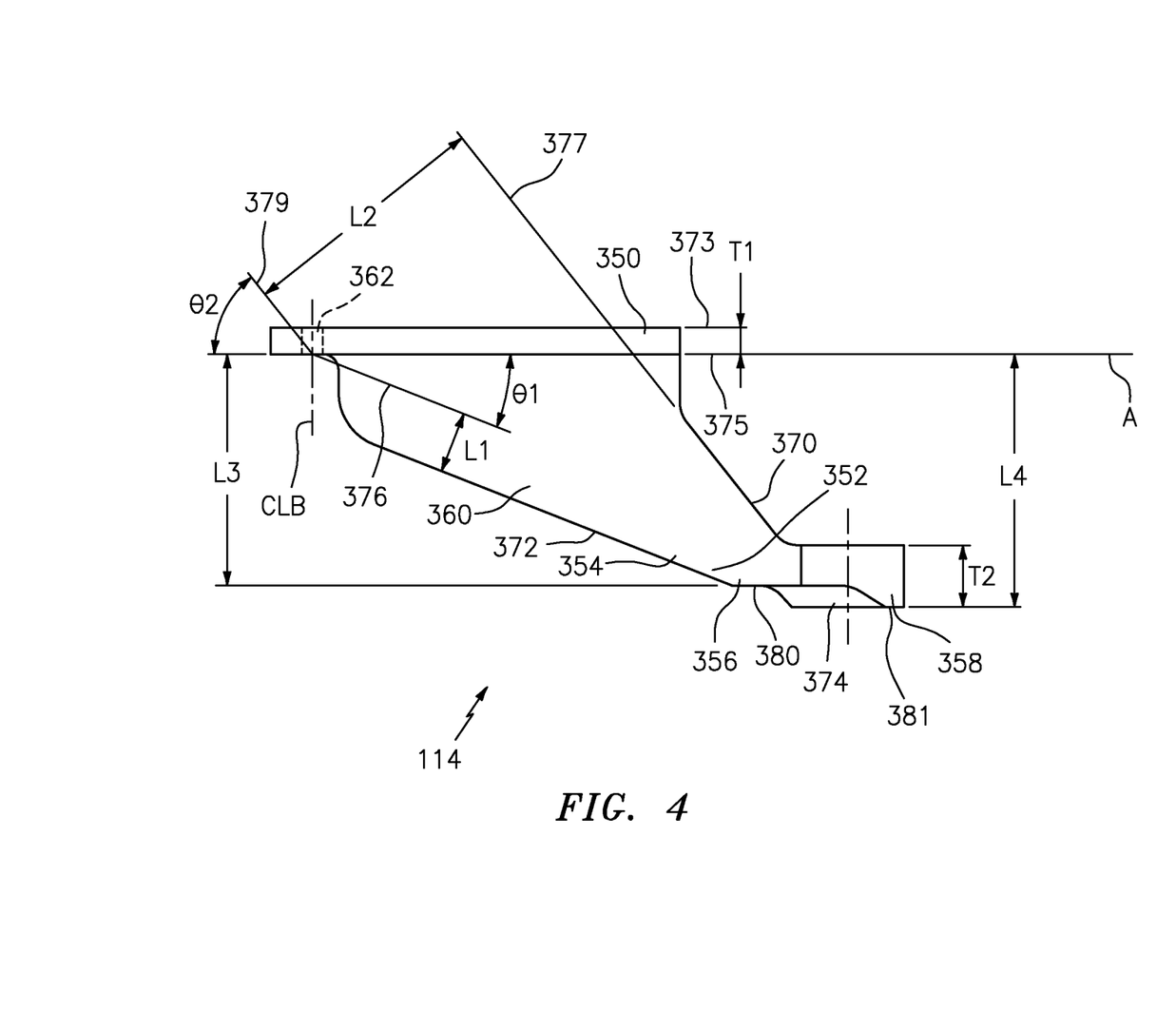
FIG. 4 is another view of the cabin air compressor support bracket of FIG. 3.

FIG. 4 is another view of the CAC support bracket 114 depicting the substantially perpendicular face 360 of the support portion 352 and side views of the CAC mounting portion 350, the upper lug 358, and the curved transition region 374. A datum A defines a reference on the CAC mounting portion 350, and centerline B (CLB) defines a centerline through CAC mounting hole 362. Datum A is defined on a non-CAC side 375 of the CAC mounting portion 350 that is opposite a CAC side 373 that is in closer proximity to the CAC 110 of FIG. 1 upon coupling the CAC support bracket 114 to the CAC 110 of FIG. 1.

An angle θ1 of about 21.5 degrees is defined between datum A at CLB and a reference line 376 formed parallel to the outer angled edge 372. The outer angled edge 372 and the reference line 376 are separated by a length L1 of about 0.81 inches (2.057 cm). A reference line 377 is defined as an extension of the inner angled edge 370, and another reference line 379 is defined parallel to the reference line 377. An angle θ2 of about 51.5 degrees is defined between datum A at CLB and the reference line 379. The reference lines 377 and 379 are separated by a length L2 of about 3.33 inches (8.458 cm). A length L3 of about 3.07 inches (7.798 cm) is defined between datum A and an outer face 380 of the upper lug portion 356. A length L4 of about 3.351 inches (8.5115 cm) is defined between datum A and an outer face 381 of the upper lug 358. In an embodiment, the CAC mounting portion 350 has a thickness T1 of about 0.355 inches (0.9017 cm), and the upper lug 358 has a thickness T2 of about 0.815 inches (2.0701 cm).

Figure 5:
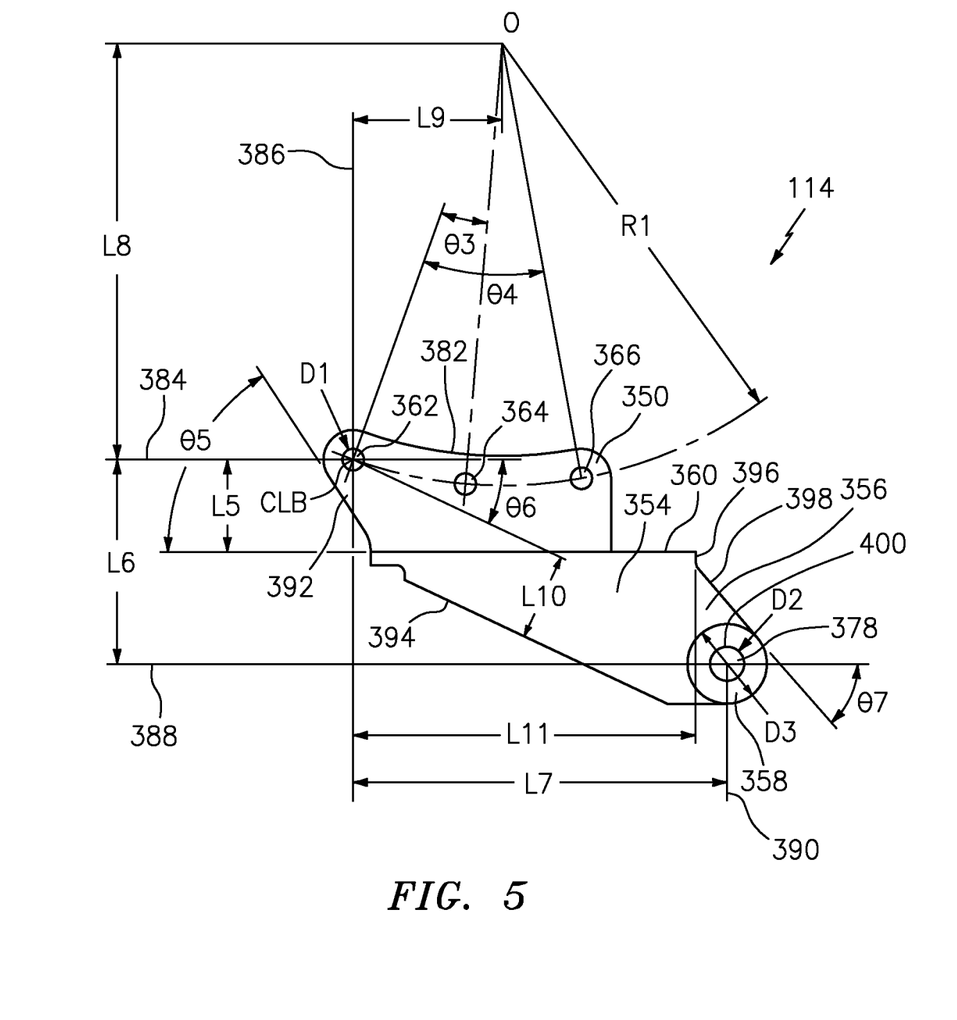
FIG. 5 is another view of the cabin air compressor support bracket of FIG. 3.

FIG. 5 is a detailed view of the CAC mounting portion 350 of the CAC support bracket 114. The CAC mounting holes 362, 364, and 366, each having a diameter D1 of about 0.406 inches (1.0312 cm), are distributed in an arc configuration along a CAC mounting hole circle radius R1 of about 8.375 inches (21.2725 cm) proximate a curved edge 382. The CAC mounting hole circle radius R1 is defined from an origin O. Relative to CLB, CAC mounting hole 364 is offset by an angle θ3 of about 15 degrees, and CAC mounting hole 366 is offset by an angle θ4 of about 30 degrees at the CAC mounting hole circle radius R1. A pair of orthogonal reference lines 384 and 386 intersects at CLB. Another pair of orthogonal lines 388 and 390 intersects at the coupling hole 378. A length L5 of about 1.76 inches (4.470 cm) is defined between the reference line 384 and the substantially perpendicular face 360.

A length L6 of about 3.863 inches (9.812 cm) is defined in a first direction between reference lines 384 and 388. A length L7 of about 7.112 inches (18.0645 cm) is defined in a second direction between the reference lines 386 and 390. Reference line 384 is offset by a length L8 of about 7.88 inches (20.015 cm) from the origin O, and reference line 386 is offset by a length L9 of about 2.837 inches (7.206 cm) from the origin O. An outer edge 392 of the CAC mounting portion 350 that is proximate to the CAC mounting hole 362 is offset at an angle θ5 of about 56.67 degrees relative to the substantially perpendicular face 360.

The ramped face 354 has an angled edge 394 defined at an angle θ6 of about 25.15 degrees relative to the reference line 384 and offset by a length L10 of about 1.645 inches (4.178 cm). A corner 396 is defined at an outer edge of the substantially perpendicular face 360 and the upper lug portion 356 proximate an angled edge 398 of the upper lug portion 356. A length L11 of about 6.5 inches (16.51 cm) is defined between the corner 396 and the reference line 386. The angled edge 398 is offset at an angle θ7 of about 49.1 degrees relative to the reference line 388.

The coupling hole 378 has a diameter D2 of about 0.6375 inches (1.6193 cm) and is configured to receive a bushing 400. The bushing 400 provides a bearing portion for a fastener (not depicted) to engage with the coupling point 116b of FIG. 1. The upper lug 358 has a diameter D3 of about 1.50 inches (3.81 cm).

Figure 6:
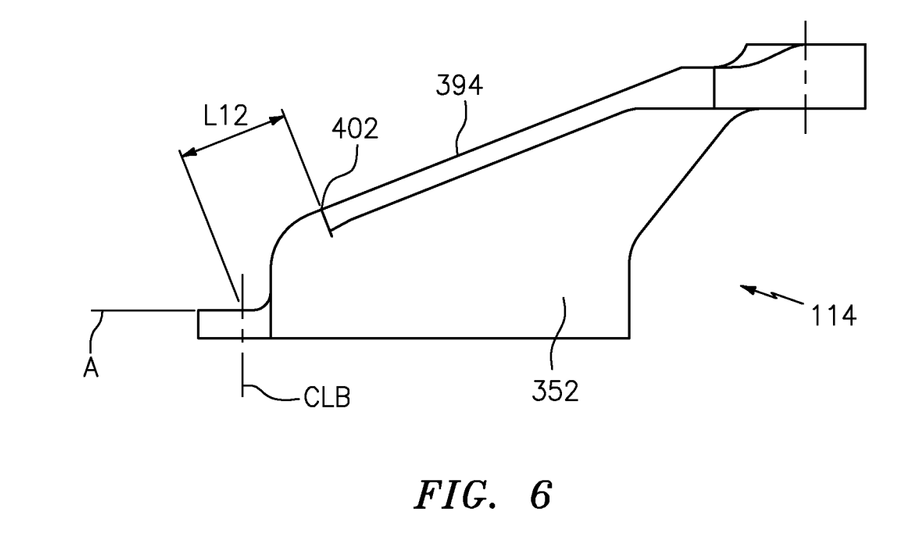
FIG. 6 is a side view of the cabin air compressor support bracket of FIG. 3.

FIG. 6 is a side view of the CAC support bracket 114. The angled edge 394 extends along the support portion 352 to an end 402 proximate CLB. The end 402 is offset by a length L12 of about 1.385 inches (3.518 cm) from CLB at datum A.

A number of ratios are defined between elements of the support bracket 114 as depicted in FIGS. 1-6. In an embodiment, a ratio of the CAC mounting hole circle radius R1 to the length L6 in the first direction is between 2.14 and 2.20, and a ratio of the CAC mounting hole circle radius R1 to the length L7 in the second direction is between 1.16 and 1.19. A ratio of the angle θ4 defined between the first and third CAC mounting holes 362 and 366 at the CAC mounting hole circle radius R1 relative to the angle θ3 defined between the first and second CAC mounting holes 362 and 364 at the CAC mounting hole circle radius R1 is between 1.90 and 2.11. A ratio of the CAC mounting hole circle radius R1 to the thickness T1 of the CAC mounting portion 350 is between 22.17 and 25.18. A ratio of the diameter D2 of the coupling hole 378 to the diameter D1 of the first CAC mounting hole 362 is between 1.53 and 1.62. A ratio of the diameter D3 of the upper lug 358 to the diameter D1 of the first CAC mounting hole 362 is between 3.58 and 3.82. A ratio of the CAC mounting hole circle radius R1 to the length L5 between the first CAC mounting hole 362 and the substantially perpendicular face 360 is between 4.67 and 4.85. A ratio of the length L4 between datum A and the outer face 381 of the upper lug 358 relative to the length L3 between datum A and the outer face 380 of the upper lug portion 356 is between 1.07 and 1.11.

A process of installing the CAC support bracket 114 in the cabin air conditioning and temperature control system 100 is described in reference to FIGS. 1-6. The upper lug 358 of the CAC support bracket 114 is coupled to the coupling point 116b of the lower three-way mount 118. The CAC mounting portion 350 of the CAC support bracket 114 is coupled to the CAC 110. The CAC support bracket 108 is also coupled to the CAC 110 and to the coupling point 104b of the upper three-way mount 102. As previously described, the CAC support bracket 114 includes the CAC mounting portion 350 with a plurality of CAC mounting holes 362-366 distributed in an arc configuration along the CAC mounting hole circle radius R1. The support portion 352 includes the ramped face 354 that transitions to the upper lug portion 356 and the substantially perpendicular face 360 relative to the CAC mounting portion 350. The upper lug 358 extends from the upper lug portion 356. The upper lug 358 includes the coupling hole 378 that is offset from a first CAC mounting hole 362 at the length L6 in a first direction and the length L7 in a second direction. A ratio of the CAC mounting hole circle radius R1 to the length L6 in the first direction is between 2.14 and 2.20, and a ratio of the CAC mounting hole circle radius R1 to the length L7 in the second direction is between 1.16 and 1.19.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A support bracket for a cabin air compressor assembly, the support bracket comprising:
   a cabin air compressor mounting portion comprising a plurality of cabin air compressor mounting holes distributed in an arc configuration along a cabin air compressor mounting hole circle radius;
   a support portion comprising a ramped face that transitions to an upper lug portion and a substantially perpendicular face relative to the cabin air compressor mounting portion; and
   an upper lug extending from the upper lug portion, the upper lug comprising a coupling hole, wherein the coupling hole is offset from a first cabin air compressor mounting hole of the cabin air compressor mounting holes at a length in a first direction and a length in a second direction, a ratio of the cabin air compressor mounting hole circle radius to the length in the first direction is between 2.14 and 2.20, and a ratio of the cabin air compressor mounting hole circle radius to the length in the second direction is between 1.16 and 1.19.

2. The support bracket of claim 1, wherein the cabin air compressor mounting holes further comprise a second cabin air compressor mounting hole and a third cabin air compressor mounting hole, and a ratio of an angle defined between the first and third cabin air compressor mounting holes at the cabin air compressor mounting hole circle radius relative to an angle defined between the first and second cabin air compressor mounting holes at the cabin air compressor mounting hole circle radius is between 1.90 and 2.11.

3. The support bracket of claim 1, wherein a ratio of the cabin air compressor mounting hole circle radius to a thickness of the cabin air compressor mounting portion is between 22.17 and 25.18.

4. The support bracket of claim 1, wherein a ratio of a diameter of the coupling hole to a diameter of the first cabin air compressor mounting hole is between 1.53 and 1.62.

5. The support bracket of claim 1, wherein a ratio of a diameter of the upper lug to a diameter of the first cabin air compressor mounting hole is between 3.58 and 3.82.

6. The support bracket of claim 1, wherein a ratio of the cabin air compressor mounting hole circle radius to a length between the first cabin air compressor mounting hole and the substantially perpendicular face is between 4.67 and 4.85.

7. The support bracket of claim 1, wherein a datum is defined on a non-cabin air compressor side of the cabin air compressor mounting portion, and a ratio of a length between the datum and an outer face of the upper lug relative to a length between the datum and an outer face of the upper lug portion is between 1.07 and 1.11.

8. A cabin air compressor support assembly comprising:
   a left-hand cabin air compressor support bracket coupled to a cabin air compressor assembly and an upper three-way mount; and
   a right-hand cabin air compressor support bracket coupled to the cabin air compressor assembly and a lower three-way mount, the right-hand cabin air compressor support bracket comprising:
      a cabin air compressor mounting portion comprising a plurality of cabin air compressor mounting holes distributed in an arc configuration along a cabin air compressor mounting hole circle radius;
      a support portion comprising a ramped face that transitions to an upper lug portion and a substantially perpendicular face relative to the cabin air compressor mounting portion; and
      an upper lug extending from the upper lug portion, the upper lug comprising a coupling hole, wherein the coupling hole is offset from a first cabin air compressor mounting hole of the cabin air compressor mounting holes at a length in a first direction and a length in a second direction, a ratio of the cabin air compressor mounting hole circle radius to the length in the first direction is between 2.14 and 2.20, and a ratio of the cabin air compressor mounting hole circle radius to the length in the second direction is between 1.16 and 1.19.

9. The cabin air compressor support assembly of claim 8, wherein the cabin air compressor mounting holes further comprise a second cabin air compressor mounting hole and a third cabin air compressor mounting hole, and a ratio of an angle defined between the first and third cabin air compressor mounting holes at the cabin air compressor mounting hole circle radius relative to an angle defined between the first and second cabin air compressor mounting holes at the cabin air compressor mounting hole circle radius is between 1.90 and 2.11.

10. The cabin air compressor support assembly of claim 8, wherein a ratio of the cabin air compressor mounting hole circle radius to a thickness of the cabin air compressor mounting portion is between 22.17 and 25.18.

11. The cabin air compressor support assembly of claim 8, wherein a ratio of a diameter of the coupling hole to a diameter of the first cabin air compressor mounting hole is between 1.53 and 1.62.

12. The cabin air compressor support assembly of claim 8, wherein a ratio of a diameter of the upper lug to a diameter of the first cabin air compressor mounting hole is between 3.58 and 3.82.

13. The cabin air compressor support assembly of claim 8, wherein a ratio of the cabin air compressor mounting hole circle radius to a length between the first cabin air compressor mounting hole and the substantially perpendicular face is between 4.67 and 4.85.

14. The cabin air compressor support assembly of claim 8, wherein a datum is defined on a non-cabin air compressor side of the cabin air compressor mounting portion, and a ratio of a length between the datum and an outer face of the upper lug relative to a length between the datum and an outer face of the upper lug portion is between 1.07 and 1.11.

15. A method of installing a support bracket in a cabin air conditioning and temperature control system comprising:
   coupling an upper lug of the support bracket to a mount of the cabin air conditioning and temperature control system; and
   coupling a cabin air compressor mounting portion of the support bracket to a cabin air compressor assembly of the cabin air conditioning and temperature control system, the support bracket comprising:
      the cabin air compressor mounting portion comprising a plurality of cabin air compressor mounting holes distributed in an arc configuration along a cabin air compressor mounting hole circle radius;
      a support portion comprising a ramped face that transitions to an upper lug portion and a substantially perpendicular face relative to the cabin air compressor mounting portion; and
      the upper lug extending from the upper lug portion, the upper lug comprising a coupling hole, wherein the coupling hole is offset from a first cabin air compressor mounting hole of the cabin air compressor mounting holes at a length in a first direction and a length in a second direction, a ratio of the cabin air compressor mounting hole circle radius to the length in the first direction is between 2.14 and 2.20, and a ratio of the cabin air compressor mounting hole circle radius to the length in the second direction is between 1.16 and 1.19.

16. The method of claim 15, wherein the cabin air compressor mounting holes further comprise a second cabin air compressor mounting hole and a third cabin air compressor mounting hole, and a ratio of an angle defined between the first and third cabin air compressor mounting holes at the cabin air compressor mounting hole circle radius relative to an angle defined between the first and second cabin air compressor mounting holes at the cabin air compressor mounting hole circle radius is between 1.90 and 2.11.

17. The method of claim 15, wherein a ratio of the cabin air compressor mounting hole circle radius to a thickness of the cabin air compressor mounting portion is between 22.17 and 25.18.

18. The method of claim 15, wherein a ratio of a diameter of the coupling hole to a diameter of the first cabin air compressor mounting hole is between 1.53 and 1.62.

19. The method of claim 15, wherein a ratio of the cabin air compressor mounting hole circle radius to a length between the first cabin air compressor mounting hole and the substantially perpendicular face is between 4.67 and 4.85.

20. The method of claim 15, wherein a datum is defined on a non-cabin air compressor side of the cabin air compressor mounting portion, and a ratio of a length between the datum and an outer face of the upper lug relative to a length between the datum and an outer face of the upper lug portion is between 1.07 and 1.11.

\* \* \* \* \*